B. PARMENTER.
CHUCK FOR TAPER AND STRAIGHT SHANK DRILLS.
APPLICATION FILED AUG. 15, 1919.

1,398,304. Patented Nov. 29, 1921.

Witness
C. E. Arundel

Inventor
B. Parmenter
by ———
Attorney.

UNITED STATES PATENT OFFICE.

BRADY PARMENTER, OF BIRMINGHAM, ALABAMA, ASSIGNOR TO A. L. ATWOOD, OF BIRMINGHAM, ALABAMA.

CHUCK FOR TAPER AND STRAIGHT-SHANK DRILLS.

1,398,304.   Specification of Letters Patent.   Patented Nov. 29, 1921.

Application filed August 15, 1919.   Serial No. 317,839.

*To all whom it may concern:*

Be it known that I, BRADY PARTMENTER, a citizen of the United States of America, residing at Birmingham, in the county of Jefferson and State of Alabama, have invented certain new and useful Improvements in Chucks for Taper and Straight-Shank Drills, of which the following is a specification.

My invention relates to a drill chuck having as its chief object the adaptation of its jaws to engage and hold with equal facility drills having straight or taper shanks.

A further object is to so design and arrange the jaws that they will grip either type of shank so firmly that it can be held in the chuck after its tang has broken off. My chuck will thus obtain the full service life from all types of drills.

A further object is to so design the chuck body that it will brace the jaws laterally for their full drill-shank-engaging length.

A further object is to set the jaws into slots in a cylindrical chuck body which is threaded so that the jaw-clamping nut will work thereon and form therewith a jaw clamping means of great strength.

A further object is to provide the chuck body with an end cap plate which serves as a reinforcement for the slotted end of the body, as a stop for the clamp nut and as a holder and protector for the jaw opening springs.

A further object is to provide the jaws with opening springs connected with a slip fit to their outer ends, thus leaving the rear end of the jaws free to adjust themselves solidly against any shape of drill shank.

My invention embodies the other details of construction and arrangements of parts which in their preferred embodiment only are illustrated in the accompanying drawings which form a part of this specification, and in which:—

Similar reference numerals refer to similar parts throughout the drawings.

Figure 1:
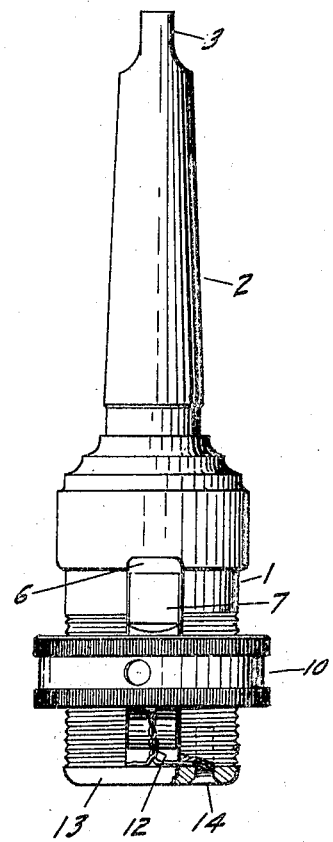
Figure 1 is a side elevation of the drill shank chuck partly broken away.
Figure 2:
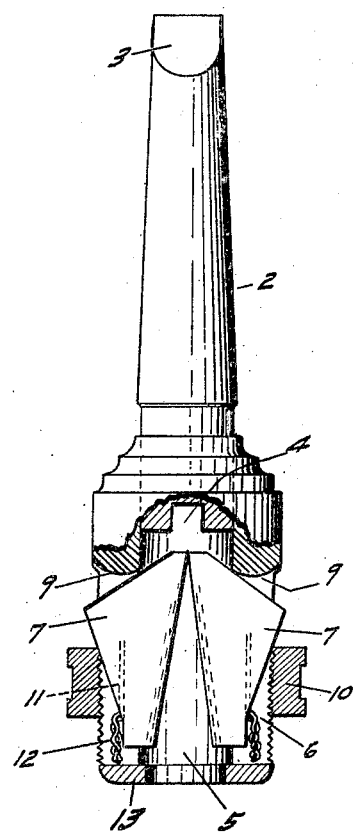
Fig. 2 is a side elevation of the chuck with its body broken away to show the jaws in elevation.
Figure 3:
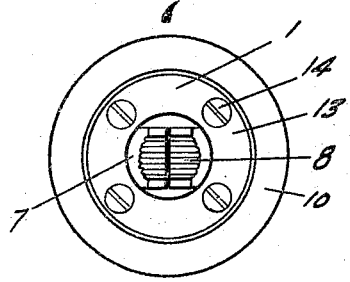
Fig. 3 is an end view of Fig. 1.

In the embodiment of my invention illustrated, the chuck comprises a substantially cylindrical body 1 having a taper socket at its inner end to receive the slightly tapered end of the chuck arbor 2 which is of the taper type having a tang 3 at its outer end and a slot 4 at its inner end for the reception of the tang on the drill shank (not shown). The chuck body is provided with a longitudinal bore 5 therethrough closed at its inner end by the arbor and left open at its outer end for the reception of the drill shank. The chuck head is also provided with a plurality of axial slots 6 extending practically its full length and opening into the central bore 5 and through its outer end. The walls of these slots are parallel and spaced so as to receive loosely in each slot a chuck jaw 7.

In the form illustrated, two slots are provided in the chuck body and two jaws 7 are employed in the chuck, each jaw having its inner longitudinal face 8 curved and longitudinally ribbed to take a strong purchase on the drill shank. The jaws are flat and substantially triangular in side elevation and are disposed with their inner ends projecting into the inner end of the bore 5 and having upper sloping side edges which normally engage the rounded inner end walls 9 of the slots 6. The apex of each triangular jaw projects beyond the outer circumference of the chuck body 1 which is threaded for the major portion of its length and adapted to receive a clamp nut 10 which by engaging the lower sloping side edges of the jaws will press them inwardly to clamp the drill shanks. The jaws are provided with elongated slots 11 in their lower or outer ends which slidably receive the inner ends of springs 12, the outer ends of which springs are attached to the outer ends of the chuck body, being preferably held in anchoring slots by means of an annular cap plate 13 which is secured to the split end of the body by a series of screws 14. The springs illustrated are formed of bent and twisted spring wire with their outer ends bent outwardly and received in slots in the outer end of the chuck body and their inner ends working in the jaw slots 11. Any other suitable type of spring may be substituted. The cap plate 13 serves both as a stop to prevent the clamp nut being run off of the chuck body, and as a reinforcement to stiffen and strengthen the split end of the chuck body.

In operation, the drill shank is inserted between the jaws and forced in until its tang engages in the slot 4 in the chuck arbor and the spring-pressed chuck jaws will open and set themselves automatically in position clamping the drill shank whether it be straight or tapered. To insure this taking place the operator presses the jaws inwardly toward the shoulders 9 of the chuck and while so held the nut 10 is run up until it binds against the sloping edges of the jaws and clamps them against the drill shank. The jaws being loose on the springs and free to swing in and out will readily accommodate themselves to the drill shank and being housed within the chuck body for their full length will be thereby strongly braced while the split end of the chuck body is itself braced by the stop plate 13, thus making a very strong, simple self contained chuck.

This invention is not intended to be restricted in scope to the specific embodiments shown, but contemplates such modifications as come within the spirit and scope of the claims.

What I claim as new and desire to secure by Letters Patent, is:—

1. A drill chuck having a cylindrical externally threaded body with longitudinal slots in its forward end, jaws disposed in said slots, each having a reversely sloping back and heel, springs mounted at the forward end of the body and each connected to a jaw so as to hold the tool engaging faces of the jaws converging inwardly and rearwardly with their heels slidably engaging the inner edge of the wall of the rear end of their respective slots, and a nut in threaded engagement with said body which is adapted to engage the backs of the jaws and throw them in to their work.

2. A drill chuck as described in claim 1, in which the springs are disposed lengthwise of the chuck body and have sliding engagement with the chuck jaws.

3. A drill chuck having a cylindrical externally threaded body provided with longitudinal slots, chuck jaws disposed in said slots and having each a sloping back and a reversely sloping heel, springs mounted in the forward end of the body, there being a longitudinal hole in the forward end of each jaw to receive loosely its respective spring end, a shoulder in the body against which said springs hold the sloping heels of their respective jaws, and a sleeve screwed on the body and adapted to engage the backs of the jaws and throw them into operative position.

In testimony whereof I affix my signature.

BRADY PARMENTER.

Witness:
   NOMIE WELSH.